United States Patent [19]

Szumierz et al.

[11] Patent Number: 4,660,279

[45] Date of Patent: Apr. 28, 1987

[54] APPARATUS FOR ELECTRICAL HARNESS MANUFACTURE

[75] Inventors: Anthony J. Szumierz, Addison; Frank P. Chmela, Downers Grove, both of Ill.

[73] Assignee: Molex Incorporated, Lisle, Ill.

[21] Appl. No.: 737,848

[22] Filed: May 24, 1985

[51] Int. Cl.[4] .............................................. B23P 19/00

[52] U.S. Cl. ........................................ 29/747; 29/759; 414/750

[58] Field of Search ................. 29/747, 748, 749, 759; 414/750, 732

[56] References Cited

U.S. PATENT DOCUMENTS 3,586,174 6/1971 Hall .................................... 414/750

4,492,023 1/1985 Schneider et al. .................... 29/749

*Primary Examiner*—Mark Rosenbaum

*Assistant Examiner*—Irene Graves Golabi

*Attorney, Agent, or Firm*—John W. Cornell; Louis A. Hecht

[57] ABSTRACT

Disclosed is an apparatus for spacing a serial succession of electrical connectors along a common centerline progression. The apparatus includes a push bar moveable toward a termination station, which is operative to space the connectors a predetermined amount, assuring alignment with the centerline progression. The push bar includes a plurality of pawl members having connector engaging tips which are receivable within recesses formed in the upper surface of each connector. The pawls are mounted to have a serial succession of increasingly greater displacements measured along the push bar in a direction away from the termination station. The succession of pawl displacements ensures proper predetermined spacing between adjacent connectors, sufficient to place the end terminals of adjacent connectors on a common centerline progression.

11 Claims, 6 Drawing Figures

APPARATUS FOR ELECTRICAL HARNESS MANUFACTURE

FIELD OF THE INVENTION

1. Field of the Invention

The present invention relates to apparatus for simultaneously terminating a plurality of electrical connectors to form one or more electrical harnesses extending in generally parallel side-by-side relationship.

2. Brief Description of the Prior Art

With the increasing use of electrical harnesses in electronic equipment today, the automatic manufacture of electrical harnesses is becoming increasingly important from an overall cost reduction standpoint. U.S. patent application Ser. No. 579,731 filed Feb. 13, 1984 and assigned to the assignee of the present invention provides an automatic harness making apparatus, wherein a plurality of connectors, arranged side-by-side, are simultaneously terminated in a single cycle. The termination equipment typically employs a single tool having a continuous series of wire insertion blades, all aligned on a common centerline or progression. Alignment of the several connectors to be simultaneously terminated, to the centerline progression of the termination equipment, must be quickly and accurately established.

Within the connector industry, the term "stackable" connector is applied to those connectors which, when butted end-to-end, have their terminals aligned on a common centerline progression. Although the spacing between terminals of a given connector might correspond to those of a neighboring connector, the adjacent end terminals of a pair of butted connectors may not lie on the same centerline progression. The term "nonstackable" is applied to describe the lack of alignment between adjacent butted connectors. The invention of U.S. patent application Ser. No. 579,731 provides a simple and effective arrangement ensuring a common centerline spacing or progression among all terminals of all nonstackable connectors simultaneously terminated. Prior to their loading at a termination station, a group of connectors are spaced apart from each other such that the adjacent end terminals of adjacent connectors are placed on a common centerline progression. A series of pins or pawls means are slid across adjacent butted connectors and are thereafter inserted between adjacent connectors so as to separate the adjacent connectors a predetermined amount, to place adjacent terminals on the desired centerline spacing.

However, the arrangement of U.S. patent application Ser. No. 579,731 is workable only with connectors having engageable end walls, and smooth-surfaced top walls. There are other types of connectors whose end walls, when the connectors are stacked or butted together, are not accessible, and/or do not have a smooth top surface to accommodate the sliding of a spacer member thereacross. Also, the spacer arrangement is useable only with a particular connector size, one having a particular number of circuits in the connector. Frequently, connectors of different circuit sizes must be interchanged throughout the course of a given production run of fabricated harnesses.

SUMMARY OF THE INVENTION

It is therefore an object of the present invention to provide an arrangement for stackably arranging nonstackable connectors having a discontinuous top surface defining one or more tool-receiving recesses therein.

Another object of the present invention is to provide an arrangement for stackably spacing a variety of nonstackable connectors having varying circuit sizes of varying physical dimensions.

Still another object of the present invention is to provide an arrangement for spacing and end-to-end serial succession of connectors which does not require access to the end walls of the connectors.

Further, to reduce the risk of wear on the top surface of a series of connectors, an object of the present invention is to provide an apparatus for spacing a serial succession of butted connectors, which limits the sliding engagement of the spacing tool across the connector top surface to only one direction of tool travel.

These and other objects of the present invention are provided in an apparatus for preparing a plurality of electrical connectors for termination with electrical wires, including a push bar movable in a first direction to space said connectors in a predetermined spaced-apart relation, and having means for mounting a plurality of downwardly extending connector engaging members, wherein the improvement comprises:

said connectors each having an upper surface defining at least two spaced apart ends and an engagement means intermediate said ends;

said connector engaging members receivable in said engagement means to engage said connectors at a point intermediate said ends; and said mounting means including displacing means for imparting a different amount of displacement to each of said engaging members relative to said push bar as said push bar is moved in said first direction, to thereby define said predetermined spaced-apart relation.

BRIEF DESCRIPTION OF THE DRAWINGS

In the drawings, wherein like elements are referenced alike.

DETAILED DESCRIPTION OF THE PREFERRED EMBODIMENT

Figure 1:
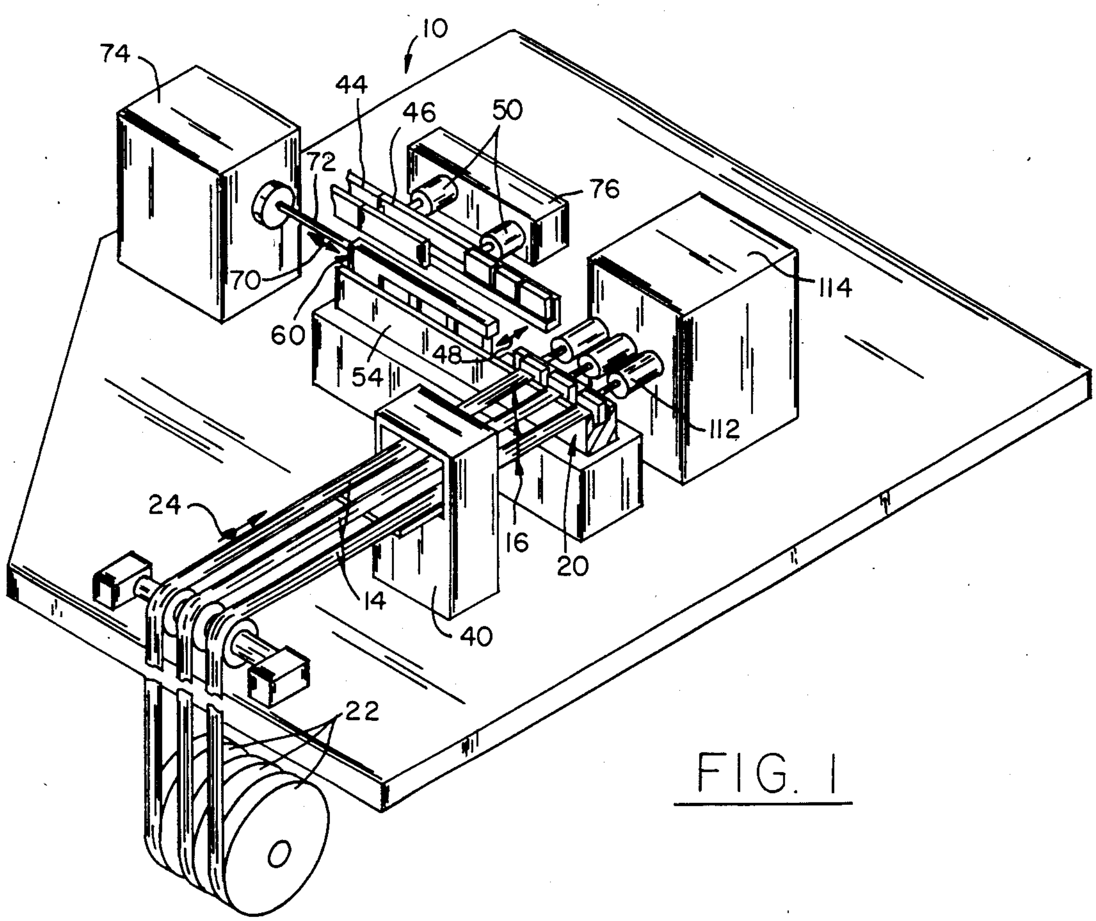
FIG. 1 is a perspective view of an apparatus according to the present invention.
Figure 2:
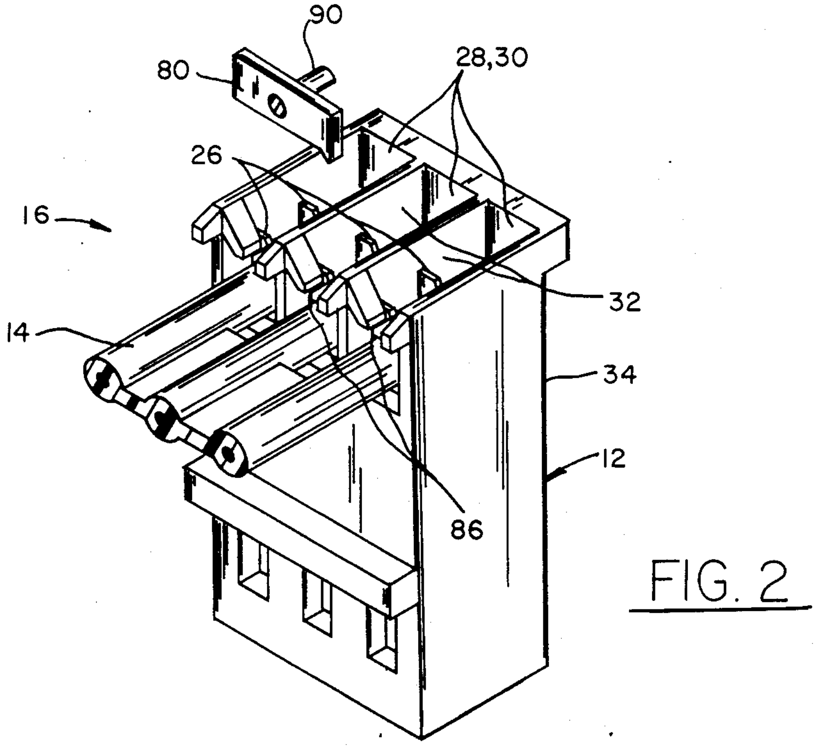
FIG. 2 is a perspective view of a connector and a single pawl taken from the apparatus of FIG. 1.
Figure 3:
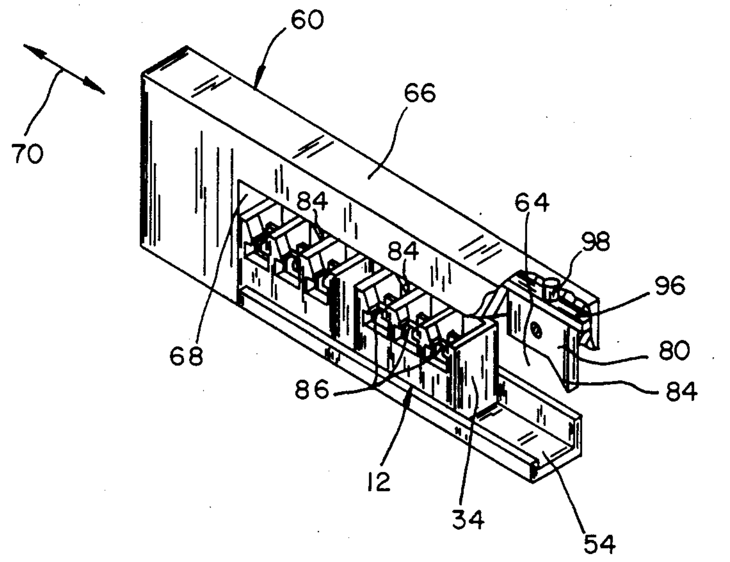
FIG. 3 is a partial perspective view showing the spacer assembly of FIG. 1 in greater detail.

Referring now to the drawings, and in particular to FIG. 1, a harness making apparatus according to the present invention is indicated generally at 10. Apparatus 10 prepares a plurality of connectors 12, initially butted end-to-end in a serial progression, for termination to a corresponding plurality of multi-conductor flat ribbon cables 14, to form completed harness assemblies indicated generally at 16. The present invention includes an arrangement for disposing connectors 12 at a termination station, indicated generally at 20, in the right hand portion of FIG. 1. Cables 14, conveniently stored on supply reels 22, are fed in the direction of arrow 24 toward termination station 20, such that their free ends overlie the top surface of connectors 12. Thereafter, the individual conductors of ribbon cables 14 are inserted into conventional insulation displacement terminals 26 which are mounted in terminal receiving passageways 28 of connector 12. As is seen most clearly in FIG. 2, the terminal receiving passageways 28 extend to the top surface of connector 12 to form a plurality of recesses 30 which receive the free ends of cable 14, and the conventional wire stuffing blades used to insert those free ends in the individual terminals 26. As can be seen in FIG. 2, passageways 28 and recesses 30 are conveniently formed by internal walls 32 and outer walls of connector housing 34, as is known in the art. For purposes of clarity, the wire stuffing blades of termination station 20, taking any suitable conventional form, are omitted from FIG. 1. Any cutoff, notching or other wire preparation performed on cables 14 is accomplished at wire preparation station 40.

Connectors 12 are taken from a bulk supply, not shown in FIG. 1, and are butted together end-to-end to form a serial succession of connectors, which is passed along feed track 44. The serial succession of butted connectors is slidingly conveyed into a connector shuttle 46 which is movable between a first retracted, or loading position (shown in FIG. 1), and a second extended delivery position as indicated by arrow 48. Shuttle 46 is mounted for extension and retraction by a pair of air-operated arms 50, which are controlled by control module 76. In its retracted loading position, connector shuttle 46 is aligned with feed track 44 so as to receive a plurality of connectors 12 pushed or otherwised transported along feed track 44. As can be seen in the perspective view of FIG. 1, the right hand free end of shuttle 46 is generally "L"-shaped. A stop pin located at the right hand free end of shuttle 46 has been omitted for purposes of clarity. In operation, the plurality of connectors are conveyed along shuttle 46, until they contact the stop pin at the right hand end thereof, to form a stack of connectors which are butted end-to-end.

Thereafter, the stacked, butted array of connectors 12 are transported to a second delivery track 54, as shuttle 46 is moved to its extended, delivery position indicated by arrow 48. When brought into engagement with delivery track 54, shuttle 46 forms a continuous channel communicating with termination station 20.

As explained above, if connectors 12 are of the stackable variety, then they need only be pushed along delivery track 54 as a butted stack of individual connectors. Thereafter, a single termination blade extending over the entire stack of connectors is lowered to stuff or otherwise insert the free ends of cables 14 into the connector terminals 26 to complete the cable termination. However, if connectors 12 are of the nonstackable type, then the array of butted connectors must be prepared so that adjacent end terminals of adjacent connectors are placed on the common centerline progression of the wire termination blade. The apparatus of the present invention conveniently performs such connector preparation by spacing the connectors apart a predetermined distance to bring the adjacent end terminals of adjacent connectors on the same centerline progression.

Figure 4:
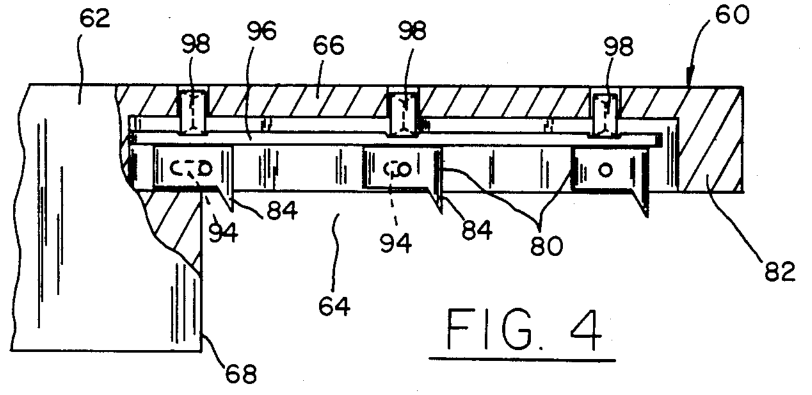
FIG. 4 is a partial cross-sectional elevational view of the spacer assembly of FIG. 3.
Figure 5:
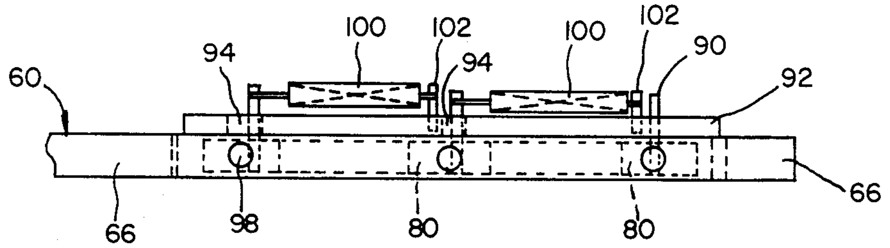
FIG. 5 is a plan view of the arrangement of FIG. 4.

Apparatus which performs the connector spacing includes a spacer assembly or push bar indicated generally at 60 in FIGS. 1, 4 and 5. Spacer assembly 60 can be seen in elevation to include an "L"-shaped housing 62 defining a connector receiving portion 64. As shuttle 46 is extended from its first loading position, to its second delivery position, the shuttle, and the connectors carried thereby are received in connector receiving portion 64 which is formed by an overlying arm portion 66 (overlying the top surfaces of the connectors), and an end wall 68.

Figure 6:
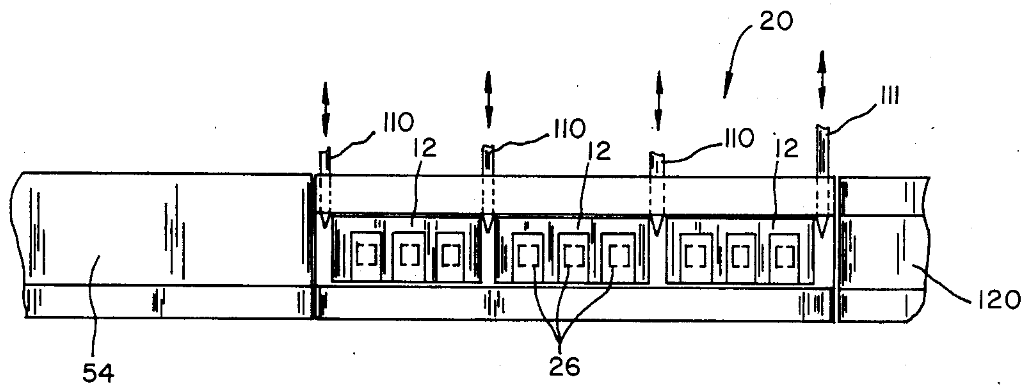
FIG. 6 is a partial plan view showing the optional gauge pin assembly of FIG. 1 providing final spacing adjustment immediately prior to cable termination.

As indicated in the upper left hand corner of FIG. 1, spacer assembly 60 is mounted for sliding reciprocable movement along delivery track 54, in the axial direction of arrow 70. An air-operated actuating arm 72 is connected to the left hand end portion of housing 62 to reciprocate spacer assembly 60 back and forth between a first, retracted loading station, as shown in FIG. 1, to an extended delivery station corresponding to termination station 20. Actuator arm 72 is controlled by a control module 74 connected to cooperate with shuttle control module 76. After arms 50 are fully extended and begin their retraction, the extension of actuator arm 72 is initiated, to push the stack of connectors 12 toward termination station 20. Spacer assembly 60 also acts as a connector delivery means, moving a stack of connectors 12 from a delivery position along track 54, to a termination position 20, underneath a wire insertion blade. After termination, the resulting harness assemblies are fed along an eject track 120 appearing to the right of track 54 in FIG. 6.

Displacement of connectors 12 to achieve a common centerline progression is accomplished during the extension of arm 72, when connectors 12 are delivered to termination station 20. As can be seen in FIG. 4, the displacing means of the present invention includes a series of identical pawls 80 mounted on an arm 66 of spacer assembly 60. Arm 66 has a bottom wall surface 82 which defines connector receiving portion 64, immediately overlying the top surfaces of connectors 12. Pawls 80 have a lower connector engaging portion 84 which extends beneath wall 82, projecting into connector receiving portion 64.

Connector engaging portions 84 must not interfere with the loading of connectors 12 in connector receiving portion 64 during extension of arms 50. Preferably, connector engaging portions 84 are fixed in a position shown in FIG. 4, and the forward end walls of connectors 12 have notched openings 86 (FIG. 2) to receive engaging portions 84. Alternatively, pawls 80 can be mounted so that their connector engaging portions 84 are retracted from the connector receiving portion 64 as connectors 12 are loaded therein, thereafter lowered to engage the connector.

As shown in the upper left hand portion of FIG. 2, pawl 80 has a mounting pin 90 staked thereto, which provides mounting to the arm 66 of FIGS. 1, 4 and 5. Referring now to the plan view of FIG. 5, the displacing means further includes a slotted plate member 92, mounted beside arm 66, and having a series of slotted openings 94 (see FIGS. 4 and 5) which receive mounting pins 90. Pawls 80 are thereby mounted for incremental displacement or reciprocation along the axis of bar 66, in the direction of arrow 70.

As shown in FIG. 4, the righthand slot 94 of plate 92 is of a minimal (i.e. circular) slot size, allowing only rotation of mounting pin 90, but not reciprocation. The middle slot 94 is elongated in the direction of arrow 70 allowing a minimum amount of displacement or reciprocation of mounting pin 90, and therefore of the middle pawl 80 affixed thereto. The left hand slot 94 has an even greater elongation, allowing greater reciprocation of its associated pawl 80. If spacer assembly 60 is to accommodate more than three connectors, the necessary additional slots formed in plate 92 would have increased elongation in the direction of arrow 70, increasing as the distance from termination station 20 is increased. That is, the succession of slots 94 has increasing elongation in a direction away from the free end of spacer assembly 60 (that end closest to termination station 20). One pawl 80 is associated with each connector 12, as will become apparent.

Pawls 80 are free to rotate about the axis of their respective mounting pin 90. A pressure plate 96, downwardly biased by springs 98, is positioned to overlie the series of pawls 80 defining a fixed positioning for connector engaging portions 84 which intrudes into connector receiving portion 64. Recesses 86 must therefore be provided in connectors 12, as explained with reference to FIG. 2. During retraction of spacer assembly 60, pawls 80 rotate in a counterclockwise direction, against the force of springs 98, as each connector wall is engaged. Alternatively, if the side walls of connectors 12 do not have recesses 86 conveniently formed therein, pawls 80 must be mounted for upward retraction as shuttle 46 is moved to its extended position, so that the connector engaging portions 84 of pawls 80 can be received within any one of the recesses 30 of a given connector 12.

With reference now to FIGS. 4 and 5, it can be seen that each pawl mounting pin 90 is biased by springs 100 to engage a first right end portion of its respective slot 94. Springs 100 are connected at a first end to a mounting pin 90, and at their second right hand end to plate member 92. As spacer assembly 60 is advanced toward termination station 20, pins 90 ride in slots 94 to stretch their respective springs 100 until pins 90 engage second left ends of their respective slots 94. The progressively increasing length of slots 94 provides the predetermined spacing between adjacent connectors 12 as spacer assembly 60 is advanced towards it extended position at termination station 20. In the preferred embodiment, the leading pawl 80 is fixedly mounted (i.e. no reciprocation) to provide a reference point for the first incremental spacing of the second connector associated with the middle pawl member 80. The slot 94 of the third, left hand pawl member 80 is equal in length to the length of the middle slot 94, plus the predetermined incremental spacing between the second and third connectors 12. As mentioned above, the length of (for additional pawls added to arm 66) slots 94 additional would continue to increase as they approach actuator arm 72.

In order to function properly, there must be a minimum amount of friction experienced by connectors 12 as they travel along delivery track 54. This friction is necessary to overcome the force of springs 100, thereby extending the springs to allow the proper amount of spacing between adjacent connectors. Not shown in FIG. 1, are a series of conventional pressure pins mounted in the channel of delivery track 54 adjacent termination station 20, to hold the spaced-apart series of connectors 12 in position as spacer assembly 60 is retracted toward the left. Other friction means will be readily apparent to those skilled in the art. Thereafter, an optional final spacing may be conveniently performed by introducing gauge pins 110 between adjacent connectors 12. An end pin 111 holds the leading connector in fixed position. As indicated by arrow 48 of FIG. 1, gauge pins 110 are mounted for reciprocation between extended and retracted positions. Their air-operated actuator arms 112 are controlled by module 114.

The series of pawls 80 are dragged across the top surface of connectors 12 only during retraction of spacer assembly 60. Pawls 80 are brought into engagement with connectors 12 without being dragged across the top connector surface, as explained above. During extension of spacer assembly 60, pawls 80 engage either the internal walls 32, or the right hand external wall of connector housing 34 to move each connector 12 independently of its neighboring connectors. The increasingly greater displacements of the pawl housing engaging members 84 (afforded by slots 94) provides the necessary spacing between adjacent connectors 12 needed to bring the terminals of adjacent connectors on a common centerline progression. As explained above, displacements of the connector engaging portions 84, are controlled by the increasing elongation of successive pin-receiving slots 94 which increases as the left hand portion of spacer assembly 60, that nearest actuator arm 72, is approached. Thus, it can be seen that, with the present invention, nonstackable connectors 12 can be made to appear to be stackable, when presented to a termination station.

Pawls 80 engage medial portions of connectors 12 lying between connector end walls, which may not always be accessible when connectors are butted together. Pawls 80 conveniently engage the recess of any terminal receiving cavity of a connector, and each pawl may engage a different circuit position of a given connector configuration. Further, the pawls may engage different sized connectors without requiring modification to the harness assembly apparatus. Also connector sizes may be freely mixed without requiring similar modification.

As will be readily appreciated by those skilled in the art, the present invention is not limited to ribbon cables, but may also be employed to manufacture cable harnesses comprised of a plurality of discrete wires independently movable with respect to each other.

I claim:

1. An apparatus for preparing a plurality of individual electrical connectors for termination with electrical wires, including a push bar movable in a first direction to space said connectors in a predetermined spaced-apart relation, and having means for mounting a plurality of downwardly extending connector engaging members, wherein the improvement comprises:

said connectors each having an upper surface defining at least two spaced apart ends and an engagement means intermediate said ends;

said connector engaging members receivable in said engagement means to engage said connectors at a point intermediate said ends;

said push bar being rigid; and said mounting means mounting said conductor engaging members to said push bar and including displacing means for imparting a different amount of displacement to each of said engaging members relative to said push bar as said push bar is moved in said first direction, to thereby define said predetermined spaced-apart relation.

2. The apparatus of claim 1 wherein said engagement means comprises a recess formed in said connector upper surface.

3. The apparatus of claim 2 further including means for positioning said connector engaging members in said connector recesses without contacting said connector upper surface.

4. The apparatus of claim 1 wherein said displacing means imparts a serial succession of increasingly greater displacements to said connector engaging members.

5. The apparatus of claim 4 wherein said displacements increase in a second direction opposite said first direction of push bar movement.

6. An apparatus for preparing a plurality of electrical connectors for termination with electrical wires, including a push bar movable in a first direction to space said connectors in a predetermined spaced-apart relation, and having means for mounting a plurality of downwardly extending connector engaging members, wherein the improvement comprises said connectors each having an upper surface defining at least two spaced apart ends and an engagement means intermediate said ends;

said connector engaging members receivable in said engagement means to engage said connectors at a point intermediate said ends;

said push bar being rigid; and said mounting means mounting said conductor engaging members to said push bar and including displacing means comprising a serial succession of increasingly longer slots in said push bar for imparting a serial succession of increasingly greater amounts of displacement to each of said connector engaging members relative to said push bar as said push bar is moved in said first direction, to thereby define said predetermined spaced-apart relation, and said mounting means further including mounting pins extending from said connector engaging members and received in respective slots for support on their associated connector engaging members.

7. The apparatus of claim 6 wherein said connector engaging members comprise pawls mounted to said mounting pins for rotation therewith.

8. The apparatus of claim 7 further including means for biasing said mounting pins toward first ends of their associated slots.

9. The apparatus of claim 4 further including a plurality of pin means movable between adjacent connectors in response to said push bar being moved in said first direction, whereby said predetermined spaced-apart relation is maintained during withdrawal of said mounting means to a point remote from said connectors.

10. The apparatus of claim 9 wherein said pin means comprise gauge pins having cross-sectional dimensions corresponding to the spaces between adjacent connectors when in said spaced-apart relation.

11. An apparatus for preparing a plurality of electrical connectors for termination with electrical wires, including a push bar movable in a first direction to space said connectors in a predetermined spaced-apart relation, and having means for mounting a plurality of downwardly extending connector engaging members, wherein the improvement comprises:

said connectors each having an upper surface defining at least two spaced apart ends and an engagement means intermediate said ends;

said connector engaging members comprising pawls receivable in said engagement means to engage said connectors at a point intermediate said ends;

said mounting means including displacing means for imparting a serial succession of increasingly greater displacements to said pawls, relative to said push bar, as said push bar is moved in said first direction, to thereby define said predetermined spaced-apart relation, said displacing means comprising a serial succession of increasingly longer slots in said push bar, with lengths becoming increasingly greater in a second opposed direction, and said mounting means including mounting pins extending from said pawls and received in respective slots for rotatably supporting said pawls; and means for biasing said mounting pins toward first ends of their associated slots, with said mounting pins moved in said second direction to opposing second ends of said slots to overcome said bias force, in response to said pawls pushing said connectors as said push bar is moved in said first direction.

* * * * *